(12) United States Patent
Boedrich

(10) Patent No.: US 6,478,319 B1
(45) Date of Patent: Nov. 12, 2002

(54) SINGLE WHEEL SUSPENSION FOR NON-STEERING WHEELS OF A MOTOR VEHICLE

(75) Inventor: Harald Boedrich, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/628,417

(22) Filed: Jul. 28, 2000

(30) Foreign Application Priority Data

Jul. 31, 1999 (DE) .......................... 199 36 173

(51) Int. Cl.$^7$ .............................................. B60G 15/00
(52) U.S. Cl. ........................ 280/124.145; 280/124.162
(58) Field of Search ................ 280/124.145, 124.146, 280/124.154, 124.162, 124.179; 267/221, 34, 179, 180

(56) References Cited

U.S. PATENT DOCUMENTS

| | | | |
|---|---|---|---|
| 3,297,312 A | * 1/1967 | Hines | 267/34 |
| 3,727,940 A | * 4/1973 | Hug | 280/124.146 |
| 4,377,280 A | 3/1983 | Wienand et al. | 267/180 |
| 5,823,552 A | 10/1998 | Etnyre et al. | 280/124.179 |
| 6,199,882 B1 | * 3/2001 | Imaizumi et al. | 280/124.146 |
| 6,375,174 B2 | * 4/2002 | Hasegawa et al. | 267/166 |

FOREIGN PATENT DOCUMENTS

| | | | |
|---|---|---|---|
| DE | 28 56 632 | 7/1980 | |
| DE | 37 28 462 | 3/1988 | |
| DE | 4129643 A1 | * 3/1993 | 280/124.153 |
| DE | 19509470 A1 | * 9/1996 | 280/124.154 |
| DE | 198 04 699 | 8/1999 | |
| EP | 0 884 201 | 12/1998 | |

* cited by examiner

Primary Examiner—Eric Culbreth
Assistant Examiner—Faye M. Fleming
(74) Attorney, Agent, or Firm—Crowell & Moring LLP

(57) ABSTRACT

An independent wheel suspension for the non-steered wheels of a motor vehicle. The independent wheel suspension includes a spring having a passage opening the size and shape of which is the result of space requirements of the spring shock absorber during the rebounding and the compression of the spring shock absorber. In a preferred embodiment, the passage opening of the spring is in the shape of an oval or an ellipse to allow the swivelling movement of a shock absorber housing within the passage opening in a direction extending along substantially a major axis of the oval or the ellipse. In addition, the exterior size and shape of the spring is arranged to be located at a distance t from the components of the independent wheel suspension including the control arms thereof. The design of the independent wheel suspension of the present. invention provides a larger load-through width for the trunk of the motor vehicle.

22 Claims, 4 Drawing Sheets though the shock absorber 9 is situated between the wheel carrier 3 and the underbody 12, the spring 16 is, at least for the most part, arranged above the underbody 12. The spring 16 therefore reaches into the trunk 14 in which, in this case, a corresponding dome must be constructed for the spring 16 in order to obtain a space for the spring 16 in the motor vehicle 1. The dome therefore reduces the load-through width of the trunk 14 by the amount which, starting from the side wall 15', extends into the trunk 14.

SINGLE WHEEL SUSPENSION FOR NON-STEERING WHEELS OF A MOTOR VEHICLE

BACKGROUND AND SUMMARY OF THE INVENTION

The invention relates to an independent wheel suspension for non-steered wheels of a motor.

It is known to use a bearing spring and a shock absorber in the case of an independent wheel suspension, the shock absorber being situated between a vehicle-body-fixed support bearing and a control arm of the independent wheel suspension or a wheel carrier. The spring is placed in the inverted position over the shock absorber, the inside diameter of the spring being designed such that, during a deflection, the shock absorber will not come in contact with the interior side of the spring.

When a twin tube shock absorber is used, as a result of the shorter length of the twin tube shock absorber, less space is advantageously required in comparison to a single tube shock absorber. However, the spring which, in the case of the twin tube shock absorber, is arranged at the upper end of the shock absorber, requires a corresponding diameter and therefore more space in the transverse direction of the vehicle. Correspondingly, domes or bulges are constructed in the trunk which limit the load-through width of the motor vehicle trunk.

It is an object of the invention to provide an independent wheel suspension for non-steered wheels of a motor vehicle, in the case of which the load-through width of the motor vehicle trunk is increased.

By adapting, according to the invention, the shape of the space bounded by the spring to the space requirement of the shock absorber during the deflection and the distance of the spring according to the invention to the components surrounding the spring, the size of the spring is reduced such that the space required for the spring is correspondingly smaller.

In another advantageous embodiment, the main swivelling direction of the shock absorber is essentially designed in the transverse direction of the vehicle so that the spring according to the invention takes up relatively little space in the longitudinal direction of the vehicle. In an advantageous embodiment, the spring according to the invention has an elliptical shape in the top view. It is also an advantage that the spring according to the invention has a conical construction.

Advantageously, the spring according to the invention is arranged such at the lower end of the shock absorber that the smaller cross-section of the spring is situated at the lower end of the shock absorber.

A uniform bending or bulging behavior and/or a uniform distribution of the tension of the spring according to the invention is advantageously achieved in that the wire diameter of the spring as well as the pitch of the spring are constructed such on the corresponding areas of the spring that the spring according to the invention has at least approximately a uniform stiffness in the required directions.

As the result of the reduced size of the spring according to the invention as well as the arrangement of the spring at the lower end of the shock absorber, when the spring shock absorber according to the invention is arranged below the trunk floor of a motor vehicle, an enlargement of the load-through width of the motor vehicle trunk is achieved.

The widening for one side amounts, for example, to maximally four times the value which is obtained from the sum of the spring wire diameter and of the safety distance between the spring and the shock absorber. According to another method of calculation, the load-through width increases by twice the value from the difference between the inside diameter of the spring, including the safety distance, and the shock absorber diameter.

In an advantageous embodiment, in which the spring shock absorber according to the invention, in the case of a powered axle, is arranged next to the output shaft, the shock absorber can be kinematically integrated such that its main swivelling direction during the deflection extends approximately in parallel to the output shaft or its components, such as an elastomer collar. In this embodiment, by means of an elliptical spring shape according to the invention, the shock absorber can be positioned closer to the output shaft by the amount which is the result of the difference between the small elliptical semiaxis and the large elliptical semiaxis.

By means of the independent wheel suspension according to the invention, a more compact axle package is obtained with a correspondingly smaller space requirement and, as a function of the kinematics, also a larger shock absorber transmission ratio, because the lower end of the shock absorber can be arranged closer to the wheel carrier of a motor vehicle wheel. Because of the maximized shock absorber ratio, the construction according to the invention requires lower forces acting in the independent wheel suspension according to the invention which results in better comfort characteristics.

Other objects, advantages and novel features of the present invention will become apparent from the following detailed description of the invention when considered in conjunction with the accompanying drawings.

BRIEF DESCRIPTION OF THE DRAWINGS

In the following, embodiments of the invention are described by means of drawings in the manner of examples.

DETAILED DESCRIPTION OF THE DRAWINGS

Figure 1:
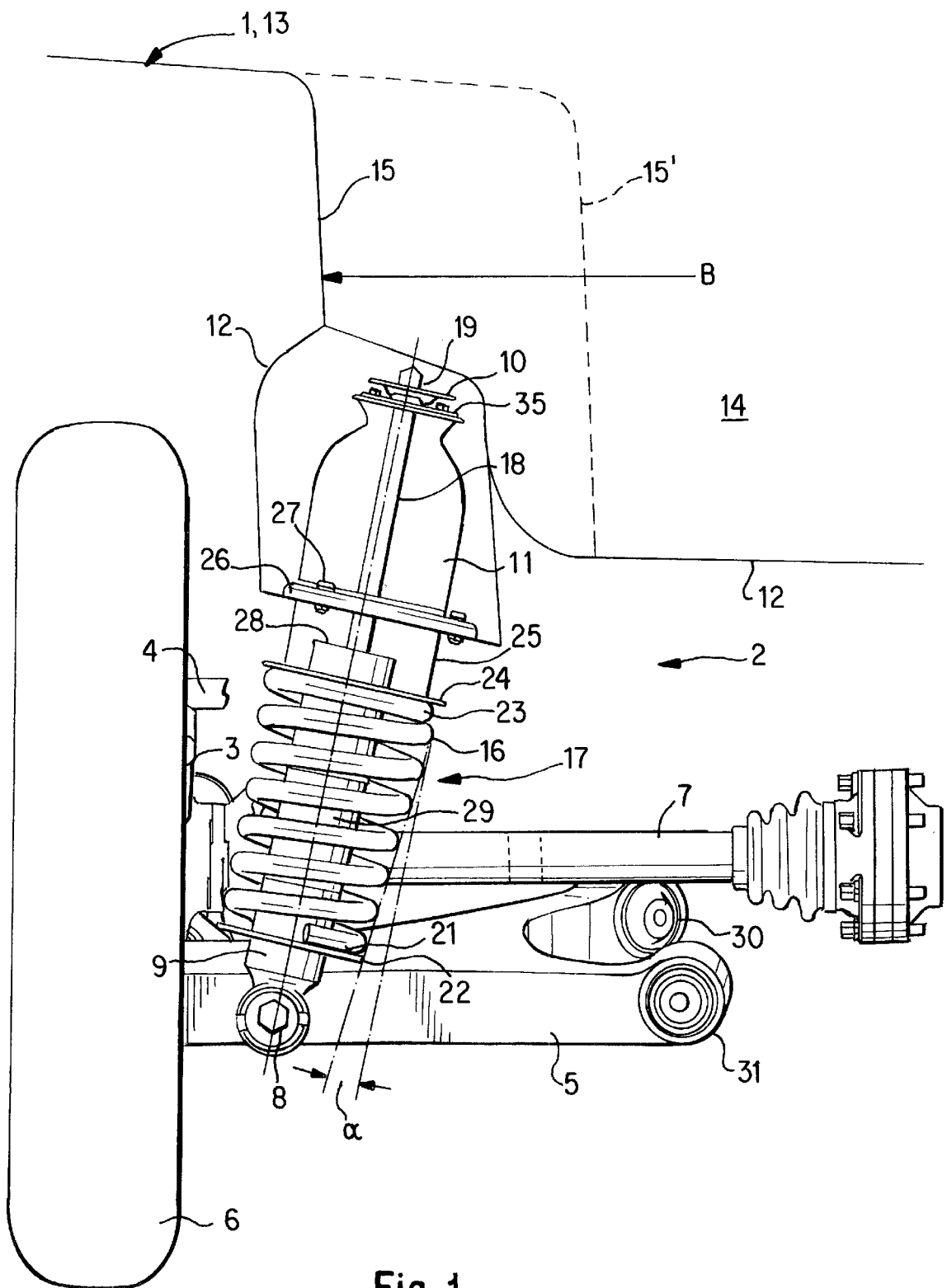
FIG. 1 is a rear view of a partially illustrated independent wheel suspension.

FIG. 1 illustrates an independent wheel suspension 2 of a motor vehicle 1. An upper transverse control arm 4, which is shown only partially, and a lower control arm 5 constructed as a rocker are linked to a wheel carrier 3. The wheel carrier 3 is arranged in a wheel 6. In addition, an output shaft 7 extends through the wheel carrier 3 to the wheel 6. A lower end 8 of a shock absorber 9 is supported at the lower control arm 5. An upper end 10 of the shock absorber 9 is fastened by way of a fastening component 11 to an underbody 12 of a body 13 of the motor vehicle 1. Above the underbody 12, a trunk 14 of the motor vehicle 1 is constructed. A side wall 15' of the trunk 14 is illustrated in FIG. 1 by means of broken lines which represents the arrangement when a conventional spring shock absorber 17 is implemented and is obtained when linking to the wheel carrier 3 above the output shaft 7. When a spring shock absorber 17 is used which includes the shock absorber 9 and a spring 16 arranged thereon, and, when the spring shock absorber is linked to the control arm 5, the side wall 15 can be displaced farther to the outside, which results in a larger load-through width B.

In the illustrated embodiment, the spring 16 is arranged between the lower end 8 of the shock absorber 9 and below the fastening component 11. The spring 16 has a conical construction and has an angle α with respect to a cylindrical construction of the spring, in which case the angle α is at $2 \leq \alpha \leq 10°$.

A piston rod 18 is guided in the shock absorber 9, which piston rod 18 is arranged with its upper end 19 on the vehicle-body-side end 20 of the fastening component 11. In addition, the upper end 19 of the piston rod 18 of the shock absorber 9 is swivellably fastened to the body 1 of the motor vehicle by way of a conventional support bearing 35. By means of its lower end 21, the spring 16 is supported on a plate 22 which is fastened to the lower end 8 of the shock absorber 9. As illustrated in FIG. 1, the plate 22 is arranged above the transverse control arm 5. An upper end 23 of the spring 16 is supported on a supporting ring 25 provided with a flange 24. The fastening component 11 is welded to the flange 26. The flange 26 and the supporting ring 25 comprise one part. The screws 27 are used for connecting the supporting ring 25 and the vehicle body 13.

Figure 2:
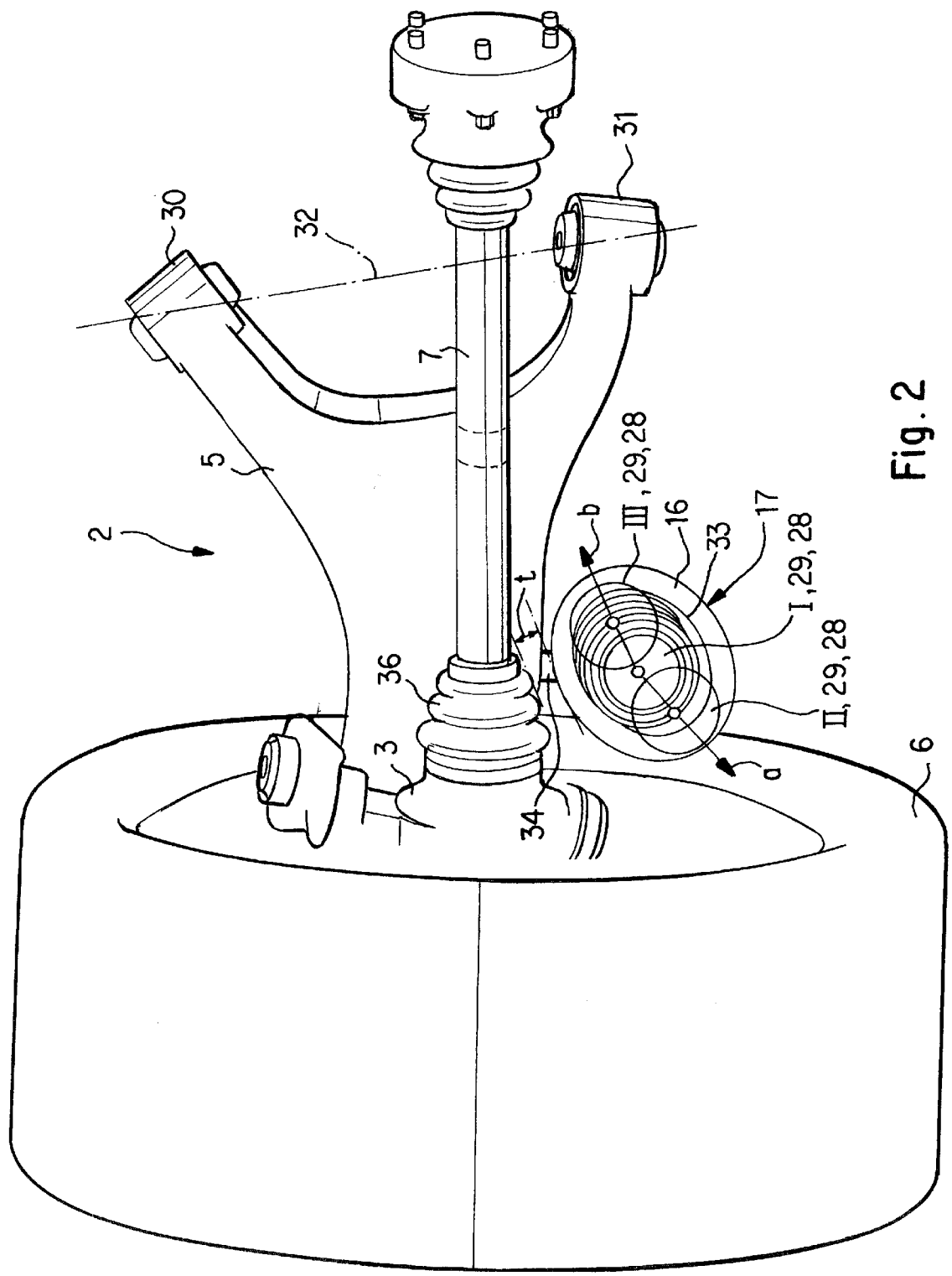
FIG. 2 is a top view of the independent wheel suspension illustrated in FIG. 1.

In FIG. 2, the fastening component 11 and the supporting ring 25 fastened thereto are not shown on the spring shock absorber 17. In the top view of an upper end 28 of a shock absorber tube 29 of the shock absorber 9, three positions I, II and III of the shock absorber 9 are illustrated.

In the middle position I, the spring shock absorber 17 is in a neutral position, for example, in the case of a spring travel $x_0=0$ mm. In position II of the upper end 28 of the shock absorber tube 29 sloped to the wheel 6, the spring shock absorber 17 is in the rebounded condition with a spring travel $x_{max}$=approx. −100 to 120 mm. In position III, the spring shock absorber 17 is in the compressed condition with a spring travel $x_{min}$=approx. 100 mm.

The arrows a and b in FIG. 2 show the swivelling directions during the rebounding and compressing of the spring shock absorber 17 with respect to an axis of rotation 32 formed by the two hinges 30 and 31 of the lower transverse control arm 5.

FIG. 2 also shows that the spring 16 has an oval or elliptical passage opening 33 having a major axis and a minor axis which, on the one hand, is the result of the space t required for the swivelling movement of the shock absorber tube 29 during the rebounding and the compression between positions II and III and, on the other hand, to components 36, for example, a collar, of the output shaft 7. The space t is a function of the swivelling movement of the shock absorber tube 29 in the direction of the output shaft 7 and amounts to at least t=10 to 20 mm. FIG. 2 shows that the thickness of the wire making up the spring 16 varies along the circumference of the oval or elliptical shape of the passage opening 33. The thickness of the wire along the major axis of the passage opening 33 is relatively smaller than the thickness of the wire along the minor axis of the passage opening 33.

FIG. 2 also shows the fastening of the lower end 8 of the shock absorber 9 by way of a bolt 34 or the like to the lower control arm 5. In another embodiment, the lower end 8 of the shock absorber 9 is linked to the lower control arm 5 such that the forces transmitted by the spring shock absorber 17 to the lower control arm 5 exercise no momentum on the lower control arm 5 that is, no vertical force onto the forward axle-carrier-side rubber bearing.

Figure 3:
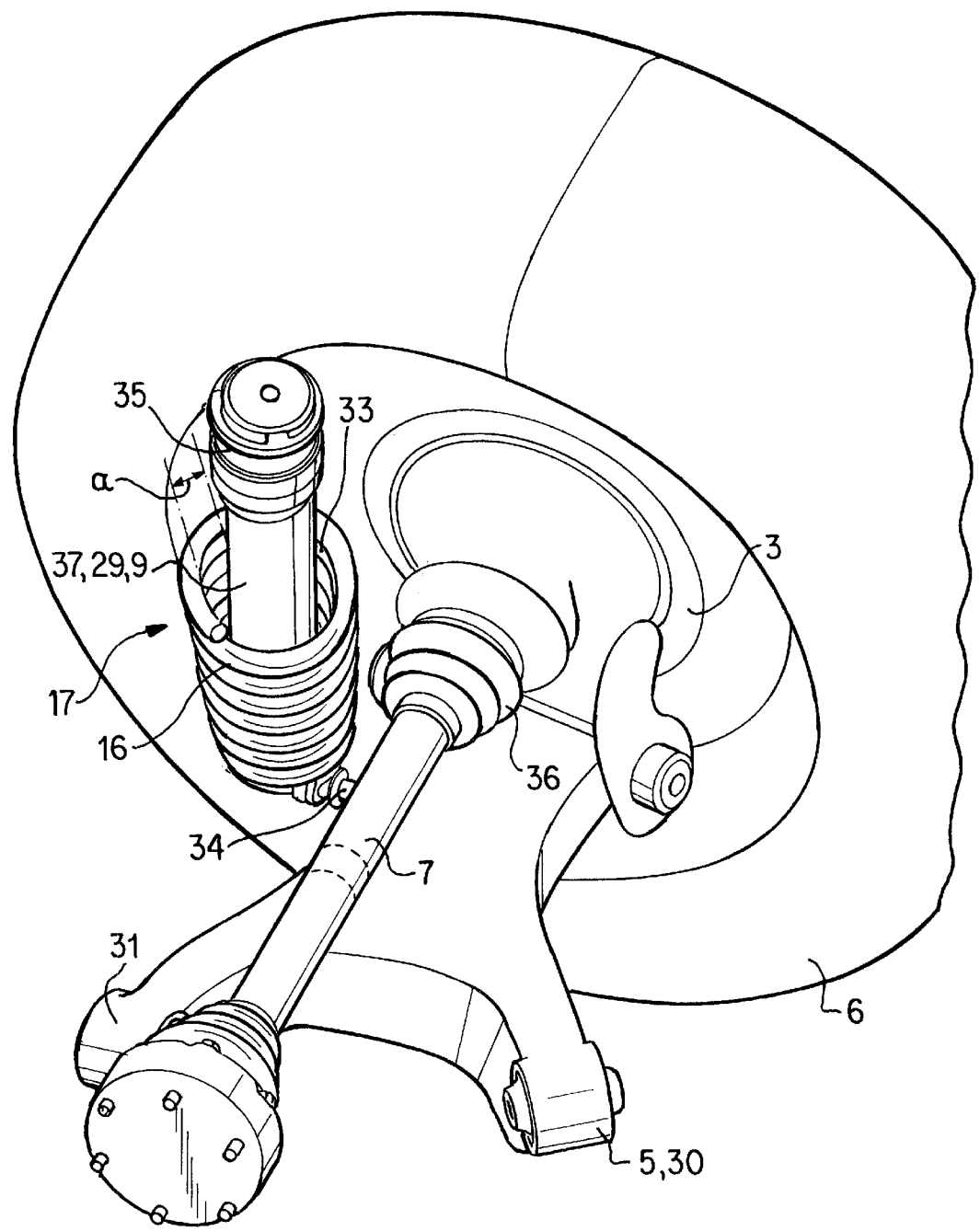
FIG. 3 is a perspective view of the independent wheel suspension illustrated in FIGS. 1 and 2.

In FIG. 3, as in FIG. 2, the upper fastening component 11 as well as the supporting ring 25 were not shown so that the constructional shape of the spring 16 is visible which is adapted to the swivelling movement of the spring shock absorber 17 and to the available space to the components 4, 5, 7 of the independent wheel suspension 2. The spring 16 also has a safety distance d to the enveloping geometry of the shock absorber tube 29 or of a protecting tube 37 of the shock absorber 9, the distance d amounting to approximately 5 to 20 mm.

Figure 4:
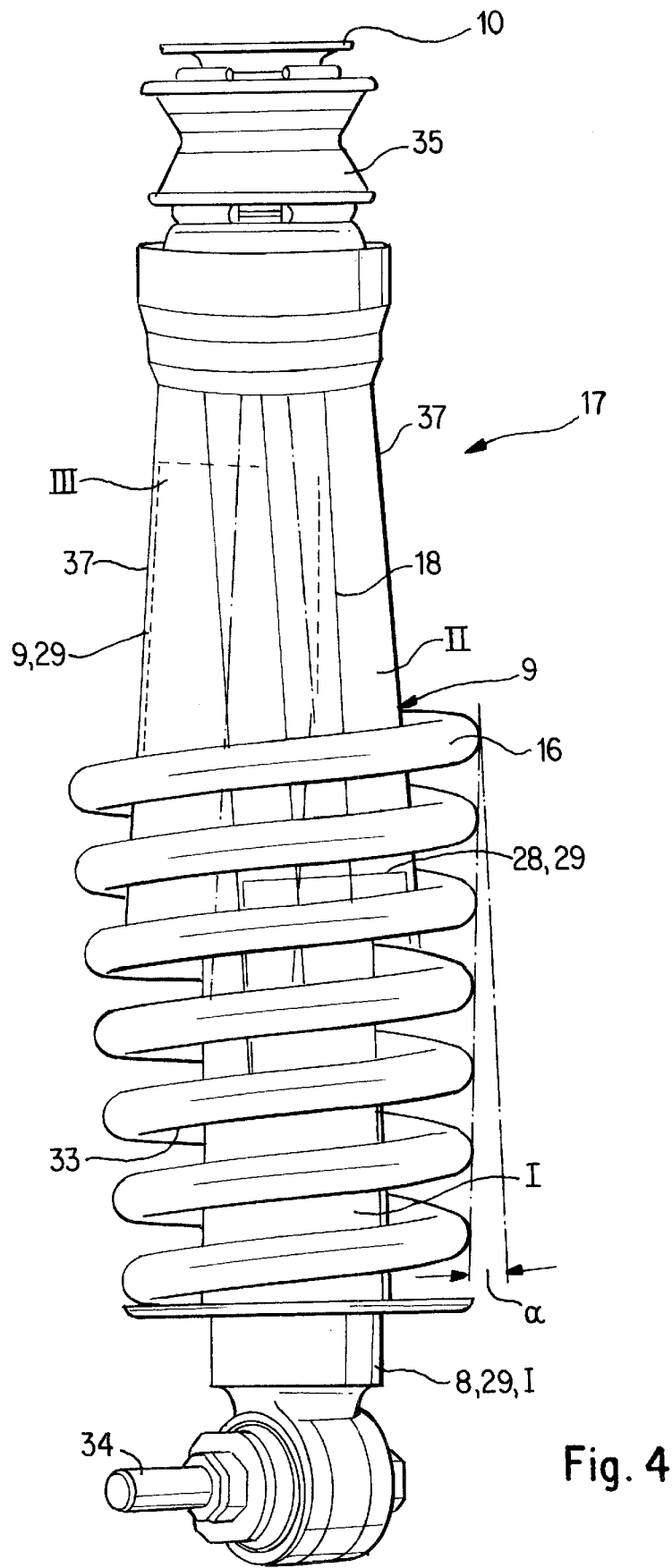
FIG. 4 is a lateral view of a spring shock absorber of the independent wheel suspension illustrated in FIGS. 1 to 3.

FIG. 4 is a lateral view of the spring shock absorber 17, in which the spring 16 is in the neutral position I, that is, in the non-rebounded or compressed condition. The lower end 8 of the shock absorber tube 29 is also shown in the neutral position I. In the upper half of FIG. 4, the shock absorber 9 is illustrated in the rebounded position II as well as in the compressed position III, in each case with the protecting tube 37, without showing the corresponding position of the spring 16. FIG. 4 shows the angle α by which the spring 16 is sloped in comparison to a cylindrical cross-section.

What is claimed is:

1. An independent wheel suspension for a non-steered wheel of a motor vehicle, comprising:
    a spring shock absorber including a spring, a shock absorber tube housing and a piston rod guided in the shock absorber housing; and
    a lower control arm linked to the wheel of the motor vehicle;
    wherein a lower end of the spring shock absorber is linked to the lower control arm and an upper end of the spring shock absorber is fastened to a body of the motor vehicle;
    wherein the spring of the shock absorber has a passage opening which is configured and dimensioned for a swivelling movement of the shock absorber housing within the passage opening during a rebounding and compression movement of the shock absorber; and
    wherein the passage opening of the spring is in the shape of an oval or an ellipse and the swivelling movement of the shock absorber housing within the passage opening is in a direction extending along substantially a major axis of the oval or the ellipse.

2. Independent wheel suspension according to claim 1, wherein a lower end of the shock absorber is linked to a control arm, and an upper end of the spring shock absorber is swivellably fastened on the vehicle body by way of a hinge, wherein a lower end of the spring is supported on the lower end of the shock absorber, and wherein an upper end of the spring is fixedly arranged by way of a supporting ring on the vehicle body.

3. Independent wheel suspension according to claim 1, wherein a uniform bending of the spring is obtained in a direction of the swivelling movement of the spring shock absorber as well as perpendicularly to the swivelling movement by means of a size and a shape of a cross-section of a spring wire of the spring and/or by a pitch of the spring adapted to a desired deformation.

4. Independent wheel suspension according to claim 3, wherein the spring shock absorber is arranged such that the swivelling direction of the spring shock absorber takes place approximately parallel to components of the independent wheel suspension or of an output shaft situated in a direct proximity.

5. The independent wheel suspension of claim 1, wherein the swivelling movement of the shock absorber housing and the major axis of the oval or the ellipse extend substantially in a transverse direction to a longitudinal axis of the motor vehicle.

6. The independent wheel suspension of claim 1, wherein the upper end of the spring shock absorber is attached to the body of the motor vehicle by way of a fastening component and the spring is arranged between the lower end of the spring shock absorber and the fastening component.

7. The independent wheel suspension of claim 1, wherein the spring has a conical shape such that the passage opening of the spring has a variable diameter along a longitudinal direction of the spring.

8. The independent wheel suspension of claim 7, wherein a lower end of the conical spring corresponds to the lower end of the spring shock absorber and the lower end of the conical spring has a smaller passage opening than an upper end of the conical spring.

9. The independent wheel suspension of claim 1, wherein the shock absorber housing is located at least a predetermined distance of 5 to 20 mm from an inner diameter of the spring during all in use operating positions of the shock absorber.

10. The independent wheel suspension of claim 1, wherein the shock absorber housing is located at least a predetermined distance of 5 to 20 mm from an inward facing side of the spring during all in use operating positions of the shock absorber.

11. The independent wheel suspension of claim 1, wherein the shock absorber housing is located at least a predetermined distance of 5 to 20 mm from an inward facing side of the spring during all in use operating positions of the shock absorber.

12. The independent wheel suspension of claim 1, wherein the swivelling movement of the shock absorber housing is in a transverse direction to a longitudinal axis of the motor vehicle.

13. The independent wheel suspension of claim 1, wherein an outer diameter of the spring is arranged to be located at least a predetermined distance from each of the lower control arm, an upper control arm and an output shaft, along substantially an entire longitudinal direction of the outer diameter of the spring during all in use operating positions of the shock absorber, the predetermined distance being sufficient to allow the swivelling movement of the shock absorber housing.

14. The independent wheel suspension of claim 3, wherein the predetermined distance measures 10 to 20 mm.

15. The independent wheel suspension of claim 1, wherein the upper end of the shock absorber is swivellably fastened to the body of the motor vehicle.

16. The independent wheel suspension of claim 1, wherein the spring has a conical shape such that the passage opening of the spring has a variable diameter along a longitudinal direction of the spring.

17. The independent wheel suspension of claim 16, wherein a lower end of the conical spring corresponds to the lower end of the spring shock absorber and the lower end of the conical spring has a smaller passage opening than an upper end of the conical spring.

18. The independent wheel suspension of claim 1, including a uniform spring bending means for providing a uniform bending of the spring in a direction of the swivelling movement and in a direction which is perpendicular to the swivelling movement.

19. The independent wheel suspension of claim 18, wherein the uniform spring bending means includes a wire diameter of the spring and a pitch of the spring.

20. An independent wheel suspension for a non-steered wheel of a motor vehicle, comprising:
a spring shock absorber including a spring, a shock absorber tube housing and a piston rod guided in the shock absorber housing ; and
a lower control arm linked to the wheel of the motor vehicle;
wherein a lower end of the spring shock absorber is linked to the lower control arm and an upper end of the spring shock absorber is fastened to a body of the motor vehicle;
wherein the spring of the shock absorber is a spiral spring which has an elliptical passage opening extending axially of the spring and surrounding the shock absorber housing at a spacing to permit swivelling movement of the shock absorber housing within the passage opening during a rebounding and compression movement of the shock absorber; and
wherein the elliptical passage opening of the spring is disposed such that the swivelling movement of the shock absorber housing within the passage opening during use is in a direction extending along substantially a major axis of the elliptical passage opening.

21. The independent wheel suspension of claim 20, wherein the major axis of the elliptical passage opening extends in use substantially in a transverse direction to a longitudinal axis of the motor vehicle.

22. The independent wheel suspension of claim 21, wherein the upper end of the spring shock absorber is attached to the body of the motor vehicle by way of a fastening component and the spring is arranged between the lower end of the spring shock absorber and the fastening component.

* * * * *